(12) United States Patent
Passerini et al.

(10) Patent No.: US 7,934,593 B2
(45) Date of Patent: May 3, 2011

(54) TRANSPORT DEVICE

(75) Inventors: Massimo Passerini, Mirabello (IT); Lamberto Vincenzi, Staggia di S. Prospero (IT)

(73) Assignee: WAM Industriale S.p.A., Modena (IT)

( * ) Notice: Subject to any disclaimer, the term of this patent is extended or adjusted under 35 U.S.C. 154(b) by 0 days.

(21) Appl. No.: 12/678,067

(22) PCT Filed: Oct. 10, 2007

(86) PCT No.: PCT/IT2007/000706
§ 371 (c)(1),
(2), (4) Date: Mar. 12, 2010

(87) PCT Pub. No.: WO2009/047811
PCT Pub. Date: Apr. 16, 2009

(65) Prior Publication Data
US 2010/0300844 A1 Dec. 2, 2010

(51) Int. Cl.
*B65G 33/26* (2006.01)
(52) U.S. Cl. .................. 198/677; 198/657; 198/676
(58) Field of Classification Search .......... 198/657, 198/658, 659, 660, 670, 676
See application file for complete search history.

(56) References Cited

U.S. PATENT DOCUMENTS

| | | | | |
|---|---|---|---|---|
| 1,371,116 A * | 3/1921 | Quelms | ............... | 198/677 |
| 2,373,662 A | 4/1945 | Dickson | | |
| 2,697,510 A * | 12/1954 | Morrison | ............... | 198/659 |
| 3,306,433 A | 2/1967 | Blanshine | | |
| 4,976,341 A * | 12/1990 | Lundell | ............... | 198/666 |
| 5,687,832 A * | 11/1997 | Thiessen | ............... | 198/676 |
| 5,761,888 A * | 6/1998 | Haley | ............... | 198/657 |
| 6,155,705 A * | 12/2000 | Douris et al. | ............... | 198/676 |
| 7,329,189 B2 * | 2/2008 | Van Mill et al. | ............... | 198/659 |
| 2002/0092799 A1 | 7/2002 | Storruste | | |
| 2008/0067036 A1 | 3/2008 | Voorthuysen et al. | | |

FOREIGN PATENT DOCUMENTS

| | | |
|---|---|---|
| EP | 1 700 800 A1 | 9/2006 |
| GB | 214 172 A | 4/1924 |

\* cited by examiner

*Primary Examiner* — James R Bidwell
(74) *Attorney, Agent, or Firm* — Pearne & Gordon LLP

(57) ABSTRACT

The transport device comprises a screw conveyor (5), in a casing (5a) of which a propeller (5b) rotates. The device also comprises an elastic cradle (7), interposed between the casing (5a) of the screw and the propeller (5b), internally of which the propeller (5b) of the screw rotates.

13 Claims, 3 Drawing Sheets

TRANSPORT DEVICE

TECHNICAL FIELD

The invention relates to a transport device of a type comprising a screw conveyor. Preferably, though not exclusively, the device is useful for performing a recuperation of aggregate materials from washing fluids of concrete containers. In particular the transport device can be usefully applied in treating fluids coming from washing operations on mobile concrete mixers which mix and transport concrete in the fluid state, and to which reference will be made in the following description, although obviously the invention can be used for treating the fluids described whatever the origin of the fluids.

BACKGROUND ART

Preparation of the concrete has for some time been done in fully-equipped facilities which load the components of the mixture into containers equipped on mobile concrete mixers, which generally perform the mixing during transport of the concrete to the places of destination. Once the concrete has been unloaded, the concrete mixer truck returns to the facility of origin, which the container in which the concrete has been mixed is internally washed using water and is emptied of the residues of the concrete, so that it is ready to perform a further transport operation. The fluid extracted from the container, which is in substance a very water-diluted concrete, is placed in special devices which wash and separate the aggregates in order for them to be re-used; the liquid part, containing cement and additives used for concrete in suspension, is generally freed from the additives and re-utilised for new mixtures, or is completely purified and sent off to the drains for disposal.

Washing devices are known which comprise an inclined screw conveyor in which, through a loading mouth, the fluid is introduced. The propeller is generally constituted by a metal spiral supported by a central shaft. The aggregate substances, which are heavier, are deposited on the bottom of the screw conveyor and are transported by the motorised propeller towards a discharge mouth. The liquid, which partially fills the screw conveyor such as to wash the aggregate substances during transport thereof, exits by skimming from the device and is sent on to further following operations.

It frequently occurs that when the device is at rest, for example during the night-time, weekends or holidays, material is left internally of the device. The material tends to solidify and produce encrustations on the internal walls and the propeller of the screw. On restart of work these encrustations have to be broken up so that the device can recommence its normal functioning.

For this reason these devices must have very robust structures, and thus are heavy and expensive to build; they also consume rather large amounts of energy and are therefore expensive to run. Notwithstanding this, it sometimes happens that external means are required, such as for example a pneumatic jack-hammer, to break up the encrustations and prevent breakage of parts of the device.

The aim of the present invention is to eliminate the above-described drawbacks, by providing a device having a structure which is lighter and less expensive than in known devices, and which offers no difficulties in breaking up the solidified parts which might have formed internally of the device.

An advantage of the invention is that it consumes limited amounts of power in comparison with prior-art devices.

A further advantage of the invention is that it makes cleaning and maintaining the device simple.

DISCLOSURE OF THE INVENTION

These aims and advantages and more besides are all attained by the invention, as it is characterised in the accompanying claims.

Further characteristics and advantages of the present invention will better emerge from the detailed description that follows, of a preferred but not exclusive embodiment of the invention, illustrated purely by way of non-limiting example in the accompanying figures of the drawings, in which.

Figure 1:
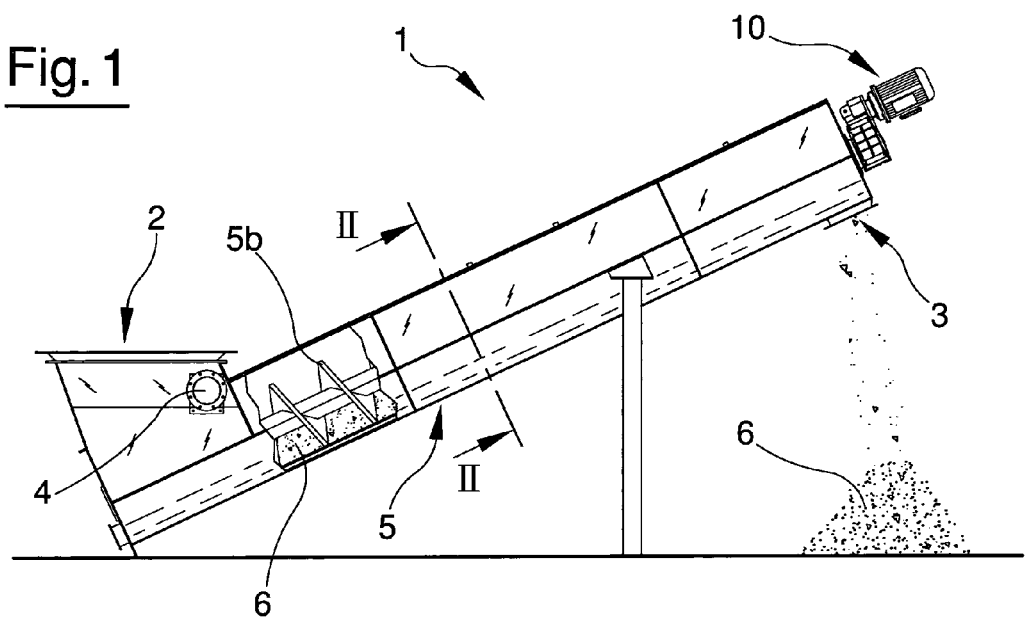
FIG. 1 is a schematic vertical elevation, with some parts removed better to evidence others, of a device of the invention.
Figure 2:
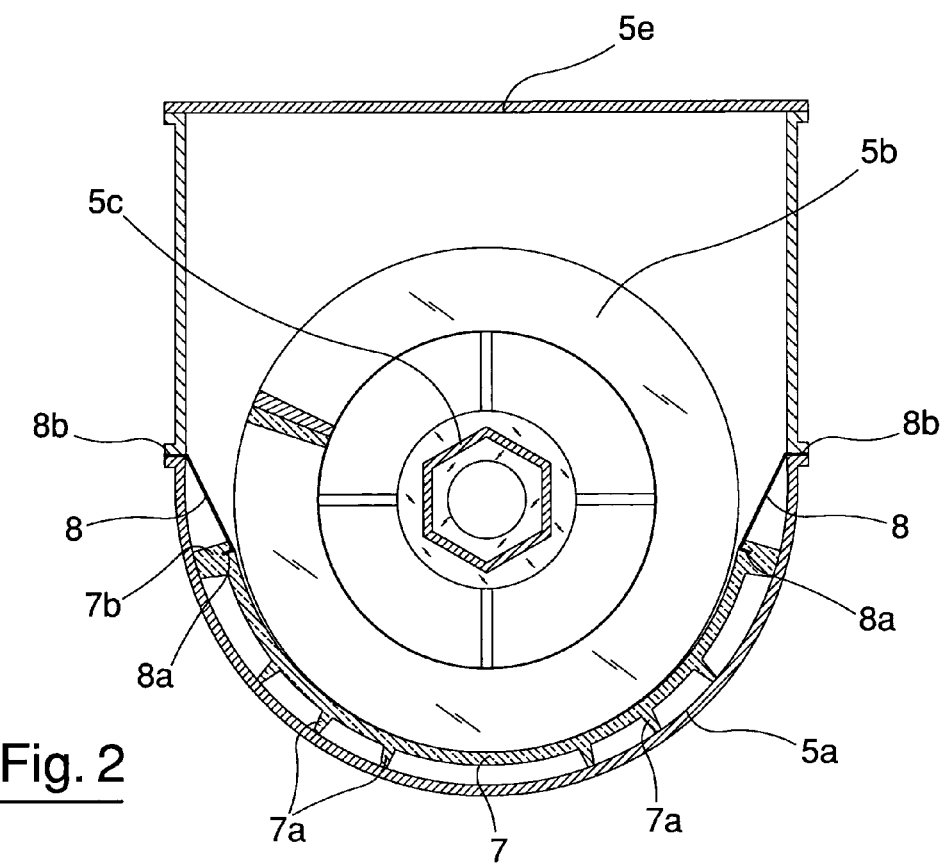
FIG. 2 is a section of a first possible embodiment of the device of the invention along a plane denoted by II-II of FIG. 1.
Figure 3:
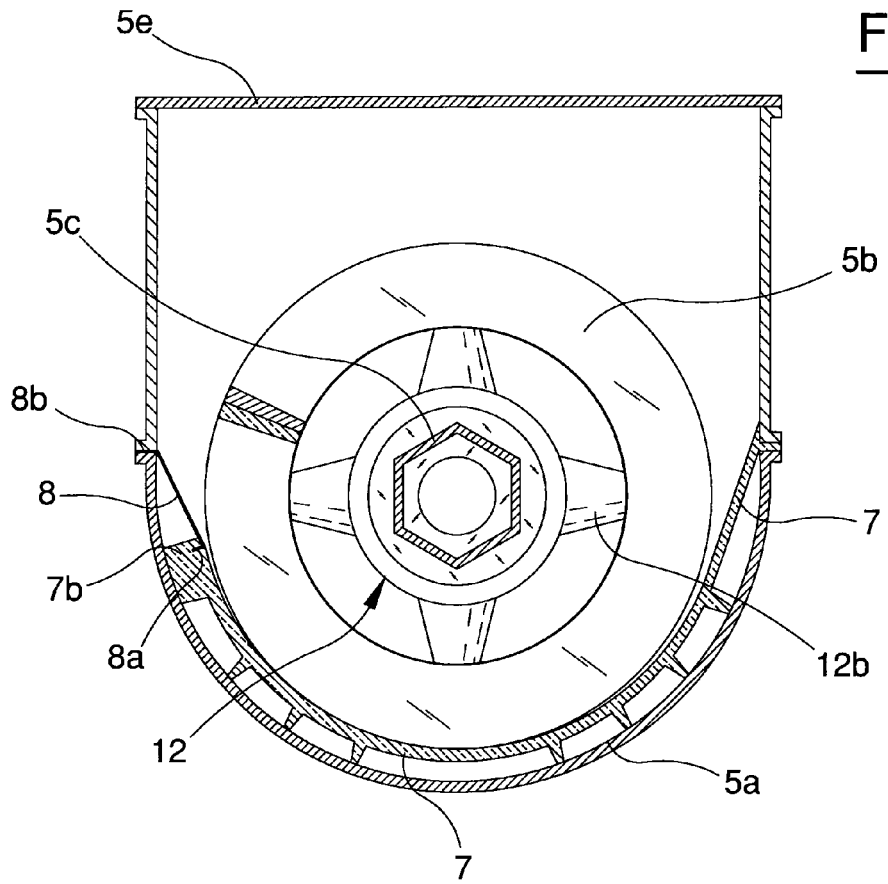
FIG. 3 is a section of a second possible embodiment, alternative to the embodiment of FIG. 2, of the device of the invention.
Figure 4:
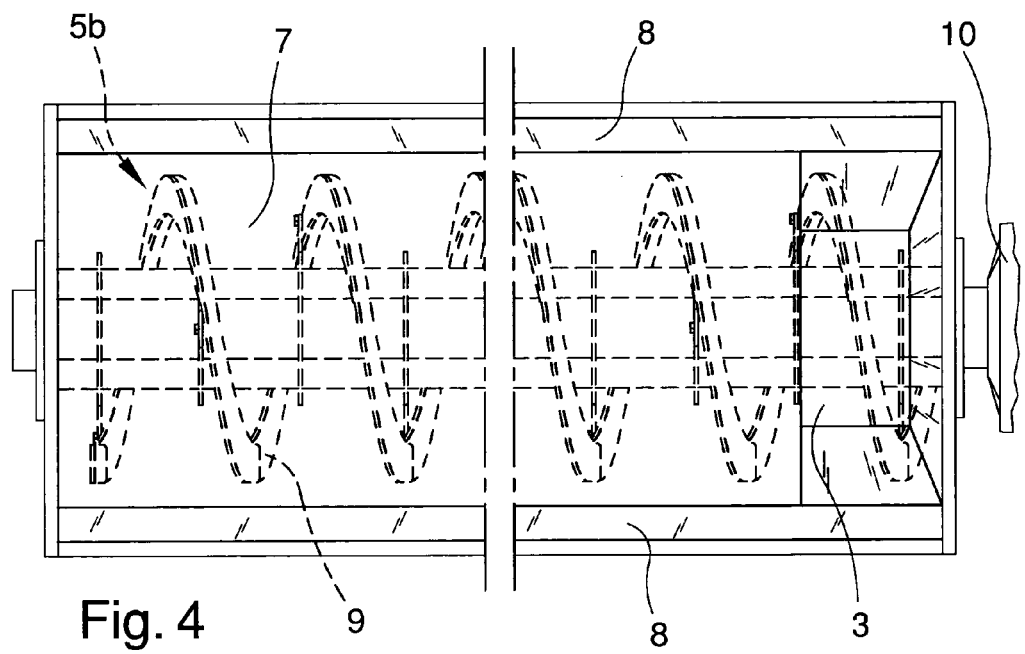
FIG. 4 is a view from above of the device, with the upper part thereof removed in order to show the inside thereof.
Figure 5:
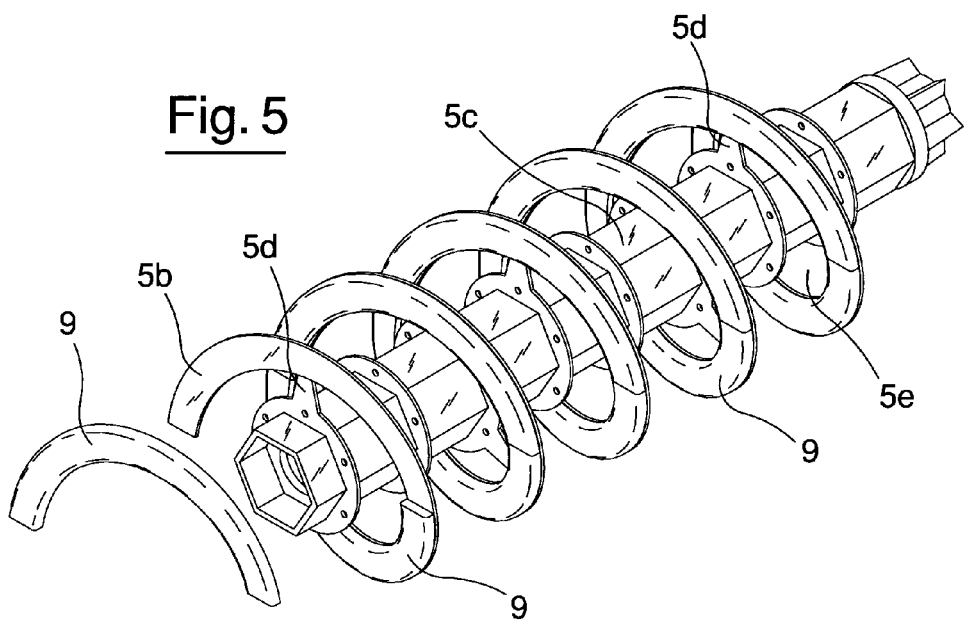
FIG. 5 is a perspective view of the propeller of the screw conveyor connected to the shaft, and of an insert still detached from the propeller.
Figure 6:
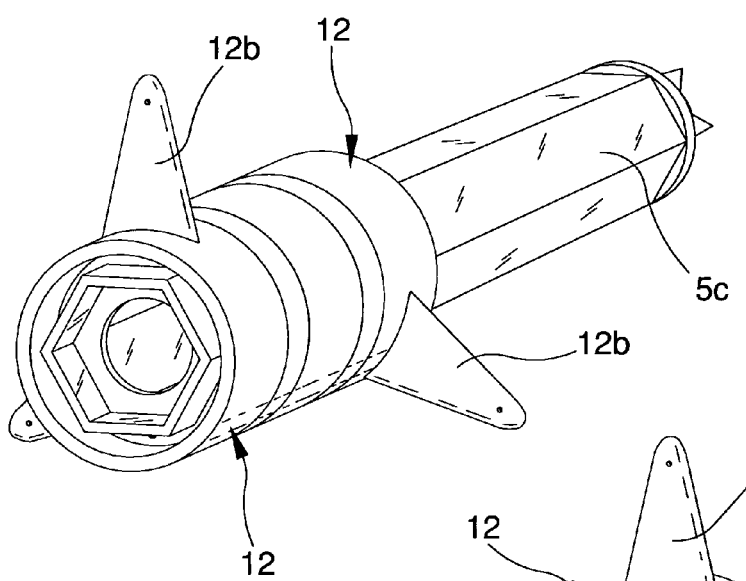
FIG. 6 is a perspective view of a different possible embodiment of the shaft of the screw.
Figure 7:
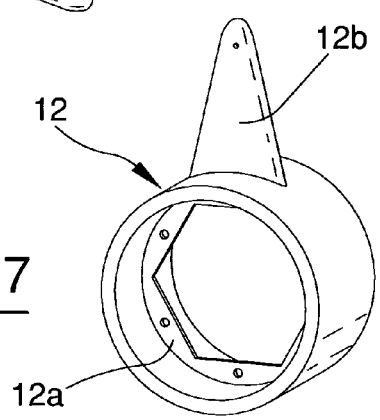
FIG. 7 is a perspective view of a possible realisation of modular elements for the covering of the screw shaft.

With reference to the above-mentioned figures, 1 denotes in its entirety a transport device of the present invention. In particular, though not exclusively, the device can be used for recuperating aggregates 6 from washing fluids in concrete-mixing containers, in particular, though not exclusively, for treating the fluids originating from washing the mixers. These fluids are, substantially, an extremely water-diluted mixture which contains aggregates, cement and any additives used for making concrete.

The device of the object comprises a screw conveyor 5, inside an outer casing of which a propeller 5b rotates, powered by a motor 10. The conveyor is provided with a loading mouth 2, which in the figures is represented as a form of hopper, through which the fluid is introduced, which fluid is to be separated from the aggregate suspended therein.

The device further comprises a first discharge mouth 3, generally located inferiorly in the final part of the device, through which the aggregate 6 transported by the propeller 5b exits the device, for example by force of gravity. A further discharge mouth 4 is also provided, normally arranged in proximity of the upper part of the loading mouth, through which the liquid part of the fluid exits from the device by overflow. As shown in the figure, the screw conveyor is kept inclined and the loading mouth, or rather the is second discharge mouth, is kept at a level such as to cause the flooding of at least part of the inside of the screw conveyor; in this way the aggregates, which by force of gravity deposit on the bottom of the conveyor and which are transported towards the first discharge mouth 3 by the rotation of the propeller of the screw, undergo, during their translation towards the discharge, a washing process which frees them of the cement and any other substance or additive. Preferably the conveyor is provided, in the zone going from the mouth 2 to the mouth 3, with a covering element 5e which superiorly closes at least part of the zone of the conveyor occupied by the propeller. If the device is predisposed to function as a simple conveyor, i.e.

in the case in which no recuperation of aggregate materials is to be performed and/or in a case in which there is no liquid part to be separated with respect to a solid part, the second discharge mouth 4 might also not be present.

Obviously the shape and positioning of the discharge mouth and the motor, as well as the shape, size and positioning of the screw conveyor, can be different from those illustrated according to different installation and needs and use destination of the device.

The device of the invention comprises an elastic cradle 7, which is preferably made of a plastic material such as, for example, polyurethane. The elastic cradle is interposed between the casing 5a and the propeller 5b of the screw conveyor. In particular the elastic cradle 7 is arranged internally of the loading mouth 2 and the first discharge mouth 3. The plastic material is particularly suitable as it has considerable elasticity, which prevents permanent deformation of the cradle 7, and adds to the anti-adherence properties, which are particularly useful, as will be better described herein below, to the functioning of the machine.

The cradle 7, internally of which the propeller of the screw rotates, preferably has a constant and arched section and surrounds the lower part of the propeller 5b in all the zone going from the loading mouth 2 to the first discharge mouth 3. In other words, the cradle 7 constitutes, in the screw conveyor, the lower part thereof, in which all the heavy parts of the fluid introduced into the device (i.e. the aggregates and cement particles) are conveyed by the propeller 5b towards the discharge mouth 3.

The cradle 7 is made, preferably by dropping plastic material into a flat-shaped die having a smooth surface, which is the surface that comes into contact with the propeller of the screw, and also has a surface fashioned with reinforcement ribs 7a, which is the surface that is rested on the casing 5a of the screw. Once realised, the cradle 7 is bent to assume the desired arch shape, is rested on the internal lower part of the casing of the casing 5a and, in a first embodiment thereof, is connected to the casing 5a by means of a pair of elastic suspension elements 8 which are each arranged at an upper longitudinal edge of the cradle 7. Preferably each of the elastic suspension elements 8 comprises a longitudinal flat spring, and end of which 8a is inserted in a channel 7b afforded on the longitudinal edge of the cradle 7 and the other end of which 8b is solidly connected to the casing 5a of the screw, for example by screws or similar.

In a second embodiment of the invention, the cradle 7 is connected to the casing 5 by a single elastic suspension element 8, of the same type and with the same connection as the casing 5a of the above-described screw; in this second embodiment, instead of the second spring 8 a longitudinal end of the cradle itself 7 is solidly connected to the casing 5a of the screw in order to ensure complete connection between the cradle 7 and the screw casing. This second embodiment increases the surface of the device having anti-adherence properties.

In both embodiments a structure (the cradle) has been obtained which is elastic in itself, as the material it is made of can elastically deform, and it is elastically constrained to the rigid structure of the screw conveyor with respect to which it can displace slightly and elastically, made possible by the springs 8 and by the direct connection thereof to the screw casing.

The device of the invention comprises means of known type for vibrating the cradle 7, on command and when the need therefor is felt. The means for vibrating the cradle 7 can be, for example, constituted simply and effectively by a pump (not illustrated) which on command injects jets of fluid (air or liquid) between the cradle 7 and the casing 5a of the screw conveyor. The action of the means for vibrating is particularly effective thanks to the structure of the cradle 7 itself, as between the reinforcement ribs 7a fashioned on the lower surface of the cradle 5a of the screw there are longitudinal apertures into which fluid jets can very easily be directed to cause the cradle 7 to vibrate.

In the device of the invention, at least a part of the propeller 5b is covered in plastic material. In particular, inserts 9 are included, made of a plastic material, which are shaped as a portion of the propeller 5b and which are connected to the propeller 5b in a terminal zone of the propeller 5b, in particular in the zone facing towards the first discharge mouth 3. The inserts 9 are consecutively connected to one another, such as to continuously cover the zone of the propeller which is facing towards the discharge.

In the device of the invention, the propeller 5b is wound on a shaft 5c the section of which is preferably polygonal, and in particular hexagonal; this increases the torsional rigidity of the shaft. The propeller 5b is connected to the shaft 5c by means of supports 5d exhibiting a central part connected to the shaft, and one or more spokes at ends of which a point of the propeller 5b is connected; in this way empty spaces 5e are left between the shaft and the propeller, which enable the solid parts of the fluid to return, obviously if they are present in large quantities, which means they are more fully washed.

In a further embodiment of the device, at least a part of the shaft 5c and the supports 5d are coated in plastic material; in particular, the parts of the shaft and the supports which are immersed in the fluid to be treated when the device is stopped are coated with plastic. Advantageously the coating of part of the shaft and the supports is obtained by modular elements 12, realised with a metal core coated in plastic material, which are provided with a central key 12a which inserts snugly in the shaft in order to perform the connection between the modular element and the shaft, and one or more plastic-coated metal projections 12b, which realise the support 5d spokes. These modular elements are inserted and fixed to the shaft, coaxially and in contact with one another, up until a desired length is coated.

In this case too, the anti-adherence surface of the device is increased.

During functioning of the device, the fluid to be treated is introduced into the mouth 2; the aggregate materials contained in the fluid, which are heavier, descend towards the bottom of the screw, i.e. towards the elastic cradle 7, and are transported by the rotation of the propeller of the screw towards the discharge mouth 3, from which they exit the device, the liquid, which partially fills the screw conveyor such as to wash the aggregate substances to during transport thereof, exits from the device by overflowing from the discharge mouth 4, if present. The presence of the elastic cradle prevents excessive stress if aggregate material inserts between the propeller and the cradle; in this case, a slight elastic deformation obtains, which facilitates the passage of the aggregate material.

When the device is stopped for a considerable amount of time, for example during the night or weekends or holidays, the solid parts of the fluid which stay inside the device, such as aggregate materials and cement particles, fall downwards and deposit inside the cradle 7, tending to solidify and produce encrustations on the internal walls and on the propeller. However, differently to what happens in known devices, in the device of the invention these encrustations do not adhere easily either to the cradle or to the propeller, given the nature of the material the cradle and propeller are made of. If the cradle 7 is suspended by a single spring 8, and if the shaft and the supports remain immersed, practically all the surfaces in contact with the fluid are coated with plastic material and therefore exhibit anti-adherence properties.

On restart of work, thanks to the poor adherence of the encrustations and the elasticity of the cradle 7, which by deforming creates spaces between the device and the encrustations, the breaking-up of said encrustations is very much easier with respect to the prior art devices. To facilitate the break-up of any encrustations, a further very useful inclusion is the presence and activation of the described means for vibrating the cradle; indeed, by activating these means during the whole shut-down period of the device, most of the encrustations will never form.

Though sturdy structures have to be provided for this type of device, which are necessary to the correct functioning thereof, the conformation of the device enables a considerable reduction to be made in the thicknesses and weights of the parts of which it is made; with the device of the invention, a saving of over a third of the weight has been made vis-à-vis known devices, as well as a considerable saving in costs. Given the ease with which the break-up of the encrustations is achieved, or indeed thank to the fact that the majority of the encrustation-forming is avoided, absorbed power needed to run the device is also lowered with respect to known machines; thus, quite apart from the lower cost of manufacturing, the overall running costs are reduced.

The invention claimed is:

1. A transport device, of a type comprising a screw conveyor (5), in a casing (5a) of which a propeller (5b) rotates, wherein the device comprises an elastic cradle (7), interposed between the casing (5a) of the screw and the propeller (5b), internally of which cradle (7) the propeller (5b) of the screw rotates; the cradle (7) being made of a plastic material, having an arc-of-circle-shaped constant section and being arranged to surround a lower part of the propeller (5b); characterised in that the cradle (7) is connected to the casing (5a) by at least an elastic suspension element (8), said elastic suspension element (8) being distinct from said cradle (7).

2. The device of claim 1, wherein the cradle (7) rests on the casing (5a) of the screw conveyor by means of ribs (7a) fashioned in a part of the screw conveyor not facing the propeller (5b), and wherein the elastic suspension element (8) is arranged at an upper longitudinal edge of the cradle (7).

3. The device of claim 1, wherein the cradle (7) rests on the casing (5a) of the screw conveyor by means of ribs (7a) fashioned in a part of the screw conveyor not facing the propeller (5b), and is connected with the casing by means of the elastic suspension element (8), arranged at an upper longitudinal edge of the cradle (7).

4. The device of claim 3, wherein the cradle (7) is connected to the casing (5a) by a pair of elastic suspension elements (8), each of which comprises a longitudinal flat spring, an end (8a) of which flat spring is inserted in a channel (7b) afforded on a longitudinal edge of the cradle (7), and another end (8b) of which flat spring is solidly connected to the casing (5a) of the screw conveyor.

5. The device of claim 3, wherein the cradle (7) is connected to the casing (5a) by an elastic suspension element (8), which comprises a longitudinal flat spring, an end (8a) of which flat spring is inserted in a channel (7b) afforded on the longitudinal edge of the cradle (7), and another end (8b) of which flat spring is solidly connected to the casing (5a) of the screw conveyor.

6. The device of claim 1, wherein at least a part of the propeller (5b) is covered with a plastic material.

7. The device of claim 6, wherein the device comprises inserts (9), made of plastic material and being shaped as portions of propeller (5b), which are connected to the propeller (5b) at a terminal zone thereof, and which continuously cover said terminal zone.

8. The device of claim 1, wherein the propeller (5b) of the screw conveyor (5) is wound on a shaft (5c) having a prismatic section and is connected to the shaft (5c) by means of supports (5d) conformed such as to leave empty spaces (5e) between the shaft (5c) and the propeller (5b).

9. The device of claim 8, wherein at least a part of the shaft (5c) and the supports (5d) are covered in a plastic material.

10. The device of claim 9, wherein: the covering of part of the shaft and the supports is obtained with modular elements (12), comprising a metal core covered with a plastic material and provided with a central key (12a) conformed such as to insert snugly in the shaft (5c), and exhibiting at least a metal projection (12b), covered with plastic, conformed such as to realise one or more connecting spokes in the supports (5d); one or more of the modular elements, which are inserted coaxially on the shaft in contact with one another, being used for covering the portion of the shaft to be covered.

11. The device of claim 1, wherein the device comprises means of known type for vibrating the cradle (7) on command.

12. The device of claim 11, wherein the means for vibrating the cradle (7) comprise a pump which, on command, introduces fluid between the cradle (7) and the casing (5a) of the screw.

13. The device of claim 1, wherein the screw conveyor (5) comprises: a loading mouth (2), through which a fluid comprising a liquid part and a part containing aggregate materials (6) can be introduced; a first discharge mouth (3) through which the aggregate materials (6) conveyed by the propeller (5b) can exit the device; a second discharge mouth (4) through which the liquid part of the fluid can exit the device; the elastic cradle (7), arranged internally of the casing (5a) of the screw, being arranged between the loading mouth (2) and the first discharge mouth (3).

* * * * *